United States Patent [19]

Ezekiel

[11] 4,386,270
[45] May 31, 1983

[54] ANGULAR INFORMATION TRANSDUCER MOUNTING

[75] Inventor: Frederick D. Ezekiel, Lexington, Mass.

[73] Assignee: Data Technology, Inc., Woburn, Mass.

[21] Appl. No.: 271,557

[22] Filed: Jun. 8, 1981

[51] Int. Cl.³ .............................................. H01J 3/14
[52] U.S. Cl. .............................. 250/231 SE; 250/239
[58] Field of Search ............ 250/231 SE, 237 G, 239; 356/395; 340/347 P

[56] References Cited

U.S. PATENT DOCUMENTS 4,326,128  4/1982  Klein ............................. 250/231 SE Primary Examiner—David C. Nelms
Assistant Examiner—Darwin R. Hostetter
Attorney, Agent, or Firm—Charles Hieken

[57] ABSTRACT

An optical encoder housing is rotatably mounted upon a hub secured to the shaft of a motor typically by a set screw. The hub also carries the encoder disc. A circular leaf spring is fastened by studs to the motor housing and the encoder housing. Alternatively a spring couples the hub to the motor shaft while the encoder housing is secured to the motor housing.

10 Claims, 3 Drawing Figures

ANGULAR INFORMATION TRANSDUCER MOUNTING

The present invention relates in general to angular information transducing and more particularly concerns novel apparatus and techniques for optically encoding angular information about a motor shaft directly connected to an optical encoder in the presence of shaft wobble and runout.

In a typical optical encoder an optical disc or commutator imprinted with a digital code is rigidly mounted to a rotating shaft. An optical head having light sources, photoelectrical transducers and an appropriate mask reads the encoded track or tracks on the rotating disc to provide a signal representative of angular characteristics of the shaft, such as position, velocity and/or acceleration. For good accuracy the air gap between the optical disc and the mask, typically about 0.005", should remain essentially constant. For example, if the shaft carrying the optical disc moves axially with respect to the housing, an error may result or severe damage caused by contact between the rotating disc and stationary elements. Furthermore, any runout or eccentricity in the shaft may also cause unacceptable errors.

Mounting an optical encoder directly on an electric motor requires the motor shaft to be held rigidly fixed in the axial direction and have very low runout. Although these characteristics are available in small motors, many large motors have axial shaft displacements of over 0.005", greater than the typical gap width between optical disc and mask, thereby preventing the use of a directly mounted encoder. During the course of a search of subclasses 231R and 231SE of class 250 the following patents were uncovered:

| | |
|---|---|
| 3,995,156 | 4,093,853 |
| 3,997,782 | 4,152,589 |
| 4,031,441 | 4,182,953 |
| 4,075,478 | 4,184,071 |

German Offenlegungsschrift No. 27 26 090 U.S. Pat. No. 4,075,478 discloses a resiliently mounted optical head in rubbing contact with the optical disc for maintaining a constant air gap. This approach has a number of disadvantages. Frictional contact between the disc and head, which may be acceptable at relatively low speeds, may be intolerable at high speeds, furthermore, wear particles resulting from the frictional contact may deposit on the optical surfaces and affect the performance of the encoder. Another disadvantage is the inability of the head to move radially in response to radial shaft movement which may occur when the shaft wobbles. Still another disadvantage is the requirement that rigid glass discs be used instead of soft plastic optical discs.

It is an important object of this invention to provide an improved mounting for angular information transducers, such as optical shaft encoders.

It is a further object of the invention to achieve the preceding object with an optical encoder disc directly mounted on a relatively large motor shaft.

It is a further object of the invention to achieve one or more of the preceding objects with relatively large motors.

It is a further object of the invention to achieve one or more of the preceding objects with structure that allows direct mounting of an optical disc on a shaft subject to runout and axial displacement while accurately sensing shaft angular characteristics and with structure that is relatively easy and inexpensive to fabricate while maintaining the desired operating characteristics for relatively long periods.

According to the invention, the angular information transducer housing is mounted on the rotatable shaft by bearing means so as to permit axial but not rotational relative displacement with respect to motor housing. There are resilient means intercoupling the motor housing and the transducer housing for allowing axial movement of the housing while preventing angular displacement of the housing about the shaft axis. The transducer rotating members, such as an optical disc, is mounted on the motor shaft in fixed relationship thereto. These elements coact to comprise means for maintaining the transducer scanning gap, such as between encoder mask and disc substantially constant as the transducer housing effectively tracks axial displacements and runouts of the motor shaft and help limit heat transfer.

Numerous other features, objects and advantages of the invention will become apparent from the following specification when read in connection with the accompanying drawing in which.

Figure 1:
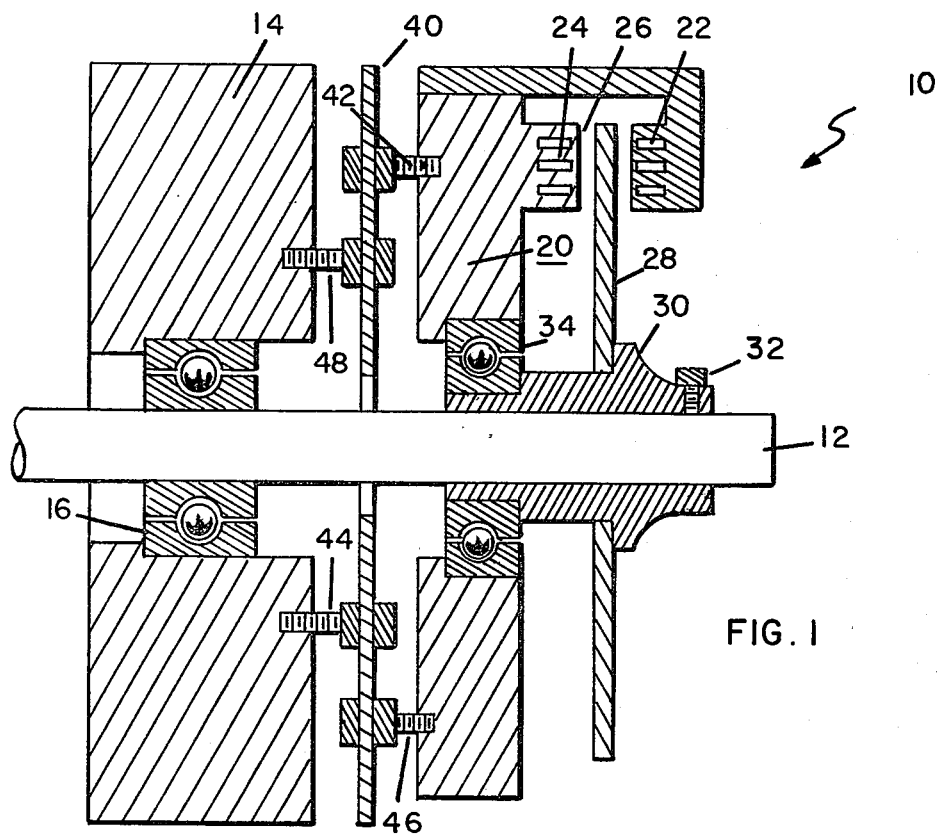
FIG. 1 is an axial sectional view of an embodiment of the invention using a flat spring.

With reference now to the drawing and more particularly FIG. 1 thereof, there is shown an axial sectional view of an optical encoder 10 (with cover removed) according to the invention mounted on motor shaft 12 of the motor having motor housing 14. Ball bearing 16 supports motor shaft 12 within motor housing 14. The same reference symbols identify corresponding elements throughout the drawing.

Optical encoder 10 comprises an encoder housing having a number of radially displaced light sources 22, typically one or more LED's, a corresponding number of optical sensors 24, typically photosensors, an optical mask 26 and other electronic circuit components (not shown) for transducing angular information into a corresponding electrical signal. Optical disc 28 is typically formed with a sequence of opaque and translucent areas and mounted on hub 30 interposed between light source 22 and optical mask 26. Hub 30 is secured to shaft 12 with set screw 32. Optical encoders are well-known in the art, and structural details are omitted here to avoid obscuring the principles of the invention.

Ball bearing 34 rotatably supports encoder housing 20 on hub 30. A circular leaf spring 40 in the form of a washer comprises resilient means for interconnecting encoder housing 20 and motor housing 14 with studs 42 and 46 on one side and studs 44 and 48 on the other for allowing relative axial movement between these housings while preventing relative angular movement about the axis of shaft 12.

When installing the encoder 10, hub 30 is displaced relative to motor housing 14 to preload leaf spring 40 in tension or compression before securing hub 30 to shaft 12 with set screw 32. Leaf spring 40 then exerts an axial force that is transmitted to ball bearing 34. This force axially preloads the balls for maintaining a tight relationship between encoder housing 20 and optical disc 28 so that the gap between optical disc 28 and optical mask 26 remains essentially constant in the presence of axial movement of shaft 12 relative to motor housing 14. Leaf spring 40 absorbs this axial movement. Leaf spring 40 also absorbs small shaft runouts or shaft bending caused by external loads without significantly altering the gap between optical disc 28 and mask 26.

Figure 2:
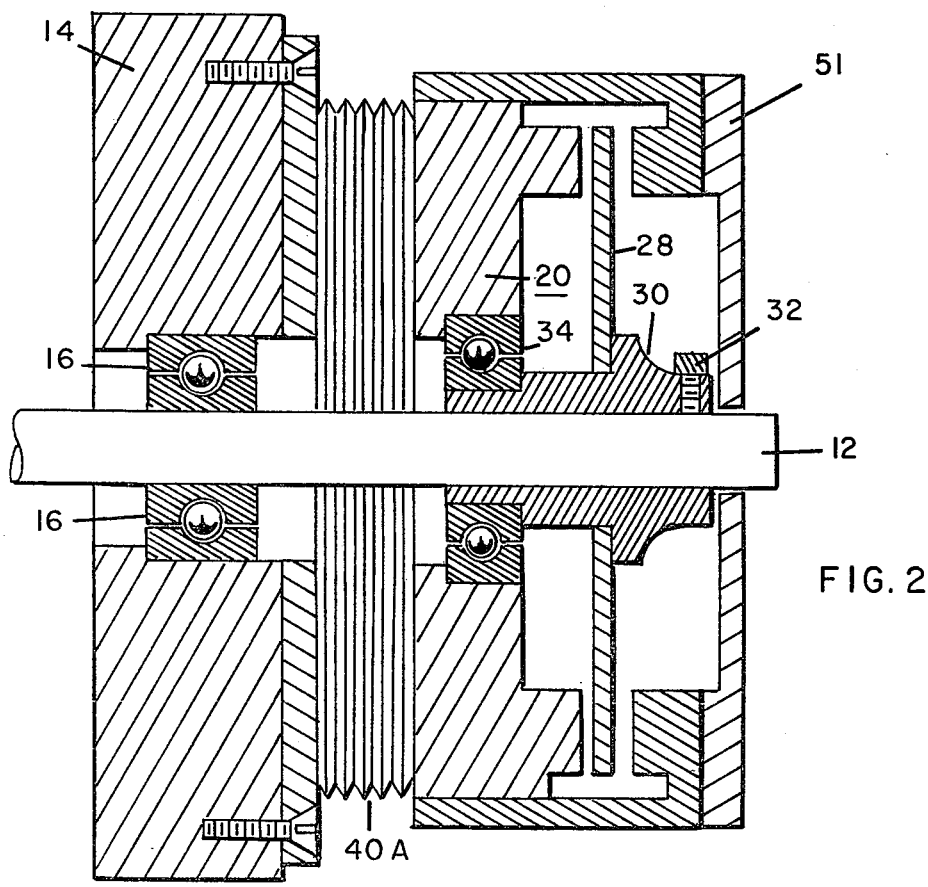
FIG. 2 is an axial sectional view of an alternate embodiment of the invention using a bellow-type spring.

Referring to FIG. 2, there is shown an alternate embodiment of the invention incorporating a bellows-like spring 40A instead of one or more circular leaf springs 40. Corresponding elements are identified by the same reference symbols throughout the drawing. Spring 40A is also preloaded and performs essentially the same functions as spring 40.

Figure 3:
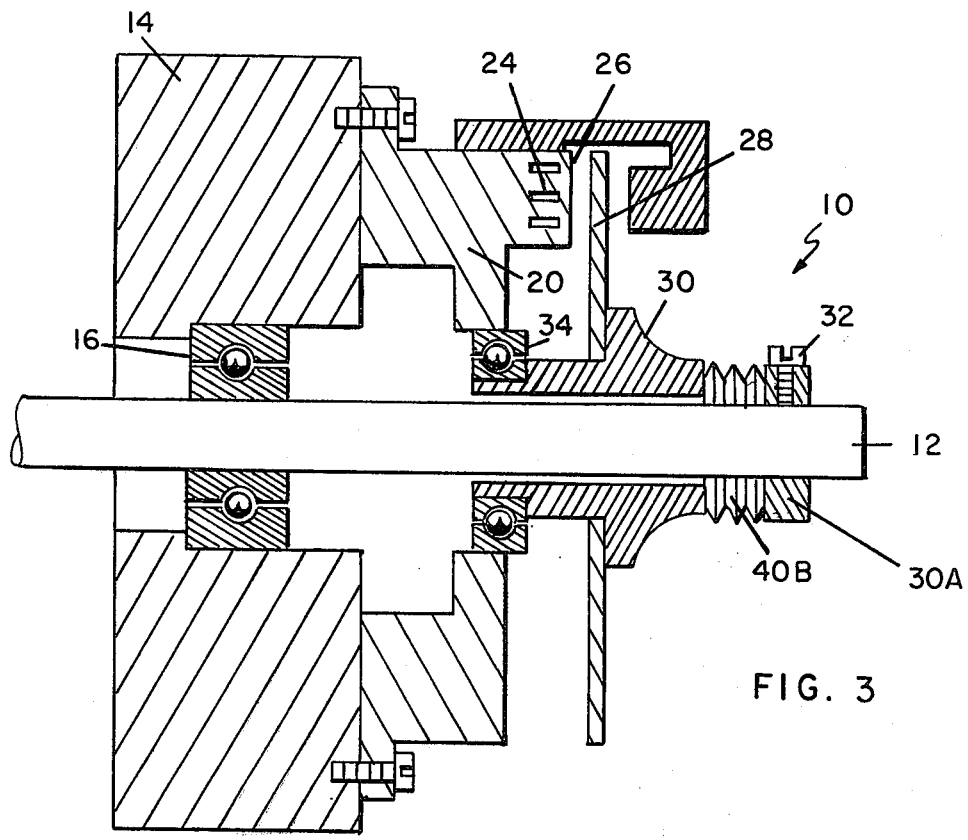
FIG. 3 is another embodiment of the invention in which the transducer disc is resiliently coupled to the rotating shaft.

Referring to FIG. 3, there is shown an alternate embodiment of the invention in which the encoder housing 20 is mounted in fixed relationship to the motor housing 14 and the encoder disc 28 is resiliently mounted upon the shaft. To this end hub 30 is connected by bellows spring 40B to an annular ring 30A fastened to shaft 12 by set screw 32. This arrangement still achieves the advantages of the other embodiments of this invention and may be more convenient to implement from the mechanical standpoint.

There has been described novel apparatus and techniques for mounting an angular information transducer to a motor shaft that facilitates accurately transducing angular information on the shaft relative to a housing in the presence of axial displacements of the shaft and shaft runout. It is evident that those skilled in the art may now make numerous other uses and modifications of and departures from the specific embodiments described herein without departing from the inventive concepts. For example, the principles of the invention are applicable to magnetic, capacitive and conductive angular transducers. Consequently, the invention is to be construed as embracing each and every novel feature and novel combination of features present in or possessed by the apparatus and techniques herein disclosed and limited solely by the spirit and scope of the appended claims.

What is claimed is:

1. Angular information transducing apparatus for transducing angular information of a shaft relative to a first housing in which the shaft is rotatably mounted comprising, angular information transducing means having a transducer housing and a transducer disc with said transducer housing including scanning means for providing a signal representative of angular information on the transducer disc, means for mounting said disc upon said shaft in fixed angular relationship thereto, means for mounting said transducer housing upon said shaft in relatively rotatable relationship therewith, and resilient means for interconnecting said angular information transducing means and the assembly of said shaft and said housing for allowing relative axial movement therebetween while preventing relative angular movement about the shaft axis between the elements interconnected by said resilient means for maintaining the gap between said disc and said scanning means substantially constant in the presence of relative axial movement between said shaft and said first housing.

2. Angular information transducing apparatus in accordance with claim 1 wherein the elements interconnected by said resilient means are said first housing and said transducer housing, said disc being mounted upon said shaft in fixed relationship thereto.

3. Angular information transducing apparatus in accordance with claim 1 wherein said means for mounting said transducer housing comprises bearing means, and means for preloading said resilient means for exerting a preloading force on said bearing means.

4. Angular information transducing apparatus in accordance with claim 3 wherein said means for mounting said disc comprises a hollow hub mounted on said shaft carrying one race of said bearing means, the other race being carried by said transducer housing, and means for maintaining at least a portion of said hollow hub on said shaft at a fixed axial position thereof to maintain said resilient means preloaded.

5. Angular information transducing apparatus in accordance with claim 4 wherein said scanning means comprises, a source of optical energy, and optical energy sensing means for providing a signal representative of the optical energy transmitted from said source through said disc.

6. Angular information transducing apparatus in accordance with claim 5 wherein said source of optical energy includes masking means for modulating the optical energy incident upon said optical disc.

7. Angular information transducing apparatus in accordance with claim 1 wherein said resilient means comprises a circular leaf spring in the form of a washer.

8. Angular information transducing apparatus in accordance with claim 7 and further comprising stud means for securing said circular leaf spring to said first housing and said transducer housing.

9. Angular information transducing apparatus in accordance with claim 1 wherein said resilient means comprises a bellow-like spring.

10. Angular information transducing apparatus in accordance with claim 1 and further comprising hollow hub means for supporting said transducer disc, said hollow hub means having a first portion supporting said transducer disc in fixed relationship and a second portion maintained in fixed relationship with said shaft, the elements interconnected by said resilient means being said first and second portions.

* * * * *